UNITED STATES PATENT OFFICE.

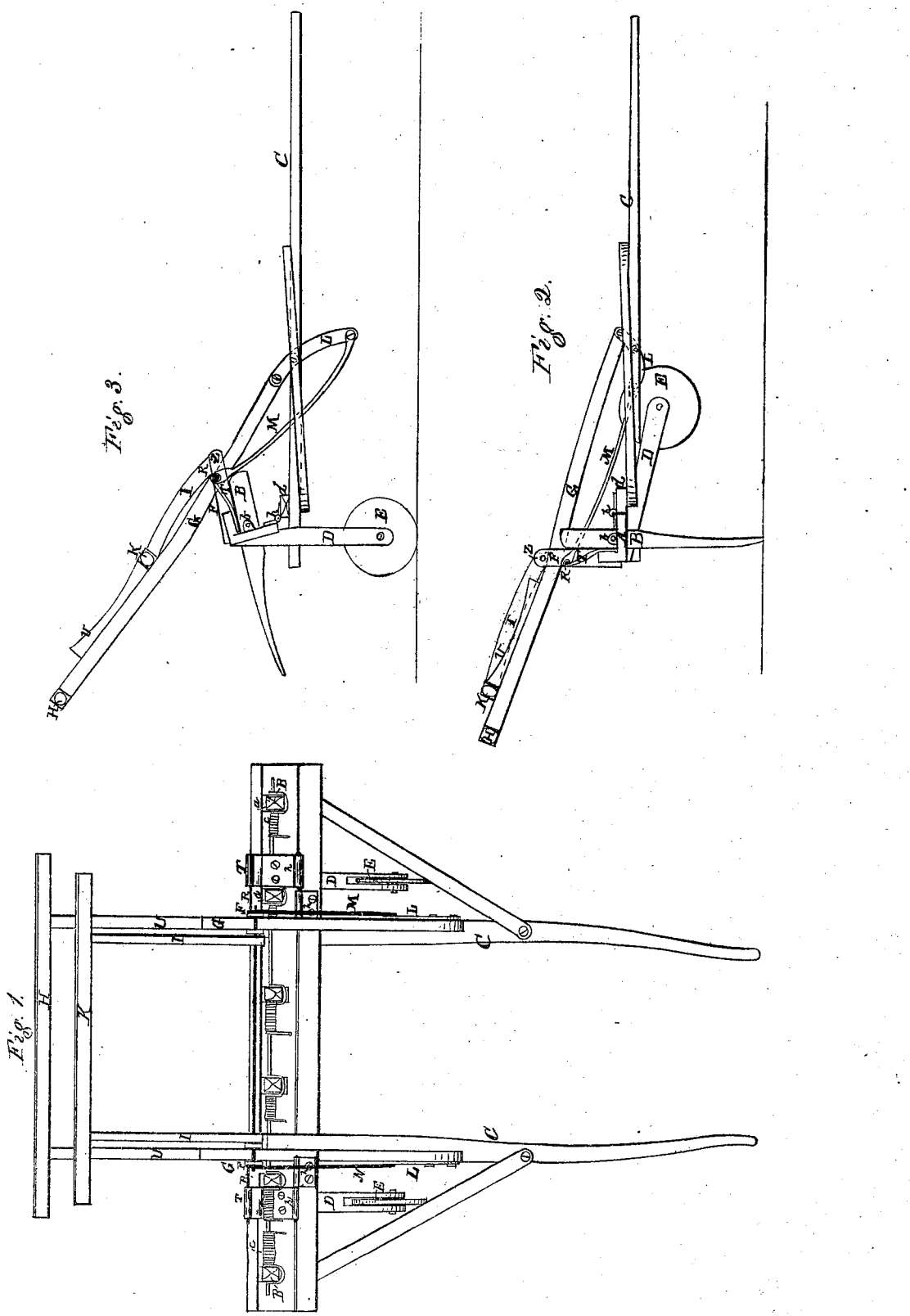

HIRAM N. TRIPP, OF ALFRED, MAINE.

IMPROVEMENT IN POWER-RAKES.

Specification forming part of Letters Patent No. 10,327, dated December 20, 1853.

*To all whom it may concern:*

Be it known that I, HIRAM N. TRIPP, of Alfred, in the county of York and State of Maine, have invented a new and useful Improvement in the Horse-Rake; and I do hereby declare that the same is fully described and represented in the following specification and the accompanying drawings, letters, figures, and references thereof.

Of the said drawings, Figure 1 denotes a top view of my improved horse-rake. Fig. 2 is a side elevation of it, the said two figures representing it as it appears with its teeth resting on the ground. Fig. 3 is a side elevation of it as it appears when its wheels are resting on the ground and the teeth thrown upward and off the same.

In the said figures, A exhibits the rake head or bar, which supports the several teeth B B B, &c., each of the said teeth being firmly fastened to it or connected with it by means of a spring, such as will admit of the tooth to spring or move backward. In the drawings the several teeth are represented as respectively extending through mortises or slots $a\,a$, &c., made through the head, and having a fulcrum-rod, $b$, passed through them and fastened to the rake-head. To each tooth a spring, $c$, is applied, one end of the same being fastened to the tooth and the other applied to the rake-head, the whole being so as to allow the tooth to fall back over an obstruction and afterward return to place, in the usual way.

The rake-head is connected to the back or cross bar, $d$, of the shafts C C by hinges $h\,h$, so that it may be turned from a horizontal into a vertical position, and from the said rake-head two arms, D D, are projected forward at a suitable distance asunder and made respectively to carry rollers or wheels E E, the whole being as shown in the drawings. Two other arms or levers, F F, are extended upward from the rake-head and are forked or made open at their upper ends to respectively receive two long bars, G G, that are connected at their rear ends by a cross hand-bar, H. The bars G G slide freely in longitudinal directions in the forks of said levers or arms F F, and through the said arms F F and two bars, I I, a rod, Z, is carried, the bars being made to turn on the rod and be united by a cross hand-bar, K. The front ends of the two bars G G are respectively jointed to two levers, L L, that play on fulcra or pins inserted in the shafts. Each lever L has a connecting-rod, M, jointed to its rear end and extended backward and made to turn at its rear end on a pin or rod, R, projected from the adjacent arm F or from it and one of two standards, T T, affixed to the rake-head.

On each bar G a shoulder-piece, U, is fastened and made to extend above it. When the rake-teeth stand vertically the rear ends of the shoulder-pieces serve as stops or shoulders for the back-draft bar K to rest against, and to confine the rake-head in position, as seen in Fig. 2. The front ends of the shoulder also answer a similar purpose with respect to the back-draft bar H when the rake-teeth are thrown off the ground or stand in the position as shown in Fig. 3, in which case the implement or horse-rake is supported by the wheels resting on the ground.

While the rake is in use, should the attendant desire to throw the teeth off the ground, and thereby bring the wheels down upon the same, he has only to lift the back-draft bar K above the shoulder-pieces U U and lay hold of the back-draft bar H and pull backward on it, while the horse or animal in the thills draws forward. Such conjoint action of the man and beast operates to throw the rake-teeth off the ground and up into a horizontal position, which position will be preserved while the bar K is in front of and resting against the front ends of the shoulder-pieces U U. In order to restore the teeth to their vertical positions, he lifts the bar K above the front ends of the shoulder-pieces and pulls back on it while the horse draws forward. Thus by the united actions of the man in rear of the rake and the animal in the thills the operation of turning the rake-head is effected.

What I claim as my invention is—

The combining with the rake-head and shafts a set of levers and back draft-bars, substantially as set forth, so that by the conjoint action of the forward draft of the horse and the back draft of the attendant the rake may be either turned up or off the ground and supported on its wheels, or turned down so as to bring its teeth in contact with the ground, all essentially as specified.

In testimony whereof I have hereto set my signature this 18th day of April, A. D. 1853.

HIRAM N. TRIPP.

Witnesses:
JAMES OTIS McINTIRE,
ISAAC MERRILL.